(12) United States Patent
Sreekumar

(10) Patent No.: US 10,112,379 B2
(45) Date of Patent: Oct. 30, 2018

(54) LARGE FORMAT ELECTROPHOTOGRAPHIC 3D PRINTER

(71) Applicant: Eastman Kodak Company, Rochester, NY (US)

(72) Inventor: Cumar Sreekumar, Penfield, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 181 days.

(21) Appl. No.: 15/209,001

(22) Filed: Jul. 13, 2016

(65) Prior Publication Data

US 2017/0210070 A1 Jul. 27, 2017

Related U.S. Application Data

(60) Provisional application No. 62/286,490, filed on Jan. 25, 2016.

(51) Int. Cl.
| | |
|---|---|
| *B33Y 10/00* | (2015.01) |
| *B33Y 40/00* | (2015.01) |
| *B33Y 50/02* | (2015.01) |
| *G03G 15/22* | (2006.01) |
| *B29C 64/124* | (2017.01) |
| *B29C 64/386* | (2017.01) |
| *B29C 64/40* | (2017.01) |
| *B29C 64/35* | (2017.01) |
| *B29K 105/00* | (2006.01) |

(52) U.S. Cl.
CPC ............ *B33Y 40/00* (2014.12); *B29C 64/124* (2017.08); *B29C 64/35* (2017.08); *B29C 64/386* (2017.08); *B29C 64/40* (2017.08); *B33Y 10/00* (2014.12); *B33Y 50/02* (2014.12); *G03G 15/224* (2013.01); *G03G 15/225* (2013.01); *B29K 2105/0085* (2013.01)

(58) Field of Classification Search
CPC ..... B29C 64/124; B29C 64/386; B29C 64/40; B33Y 10/00; B33Y 50/02; B33Y 30/00; B33Y 40/00; G03G 15/224; G03G 15/225
USPC ........................................................ 264/484
See application file for complete search history.

(56) References Cited

U.S. PATENT DOCUMENTS

| | | |
|---|---|---|
| 9,144,940 B2 | 9/2015 | Martin |
| 2013/0077996 A1 | 3/2013 | Hanson et al. |
| 2013/0077997 A1 | 3/2013 | Hanson et al. |
| 2013/0186549 A1 | 7/2013 | Comb et al. |
| 2013/0186558 A1 | 7/2013 | Comb et al. |
| 2015/0024317 A1* | 1/2015 | Orrock ............... G03G 9/08768 430/108.3 |

* cited by examiner

*Primary Examiner* — Alexander M Weddle
(74) *Attorney, Agent, or Firm* — Kevin E. Spaulding

(57) ABSTRACT

A three-dimensional part and associated support structure is constructed using an electrophotography-based additive manufacturing system. A support layer is developed using a first electrophotography engine, and a part layer is developed using a second electrophotography engine. The developed support and part layers are transferred to a transfer medium and moved into alignment with a tile region of a layer transfusion assembly, where the transferred part and support layers are transfused to previously-printed layers. This process is repeated for a plurality tile regions and for a plurality of layers to construct a three-dimensional part having a footprint larger than a maximum printable area of the first and second electrophotography engines.

14 Claims, 8 Drawing Sheets

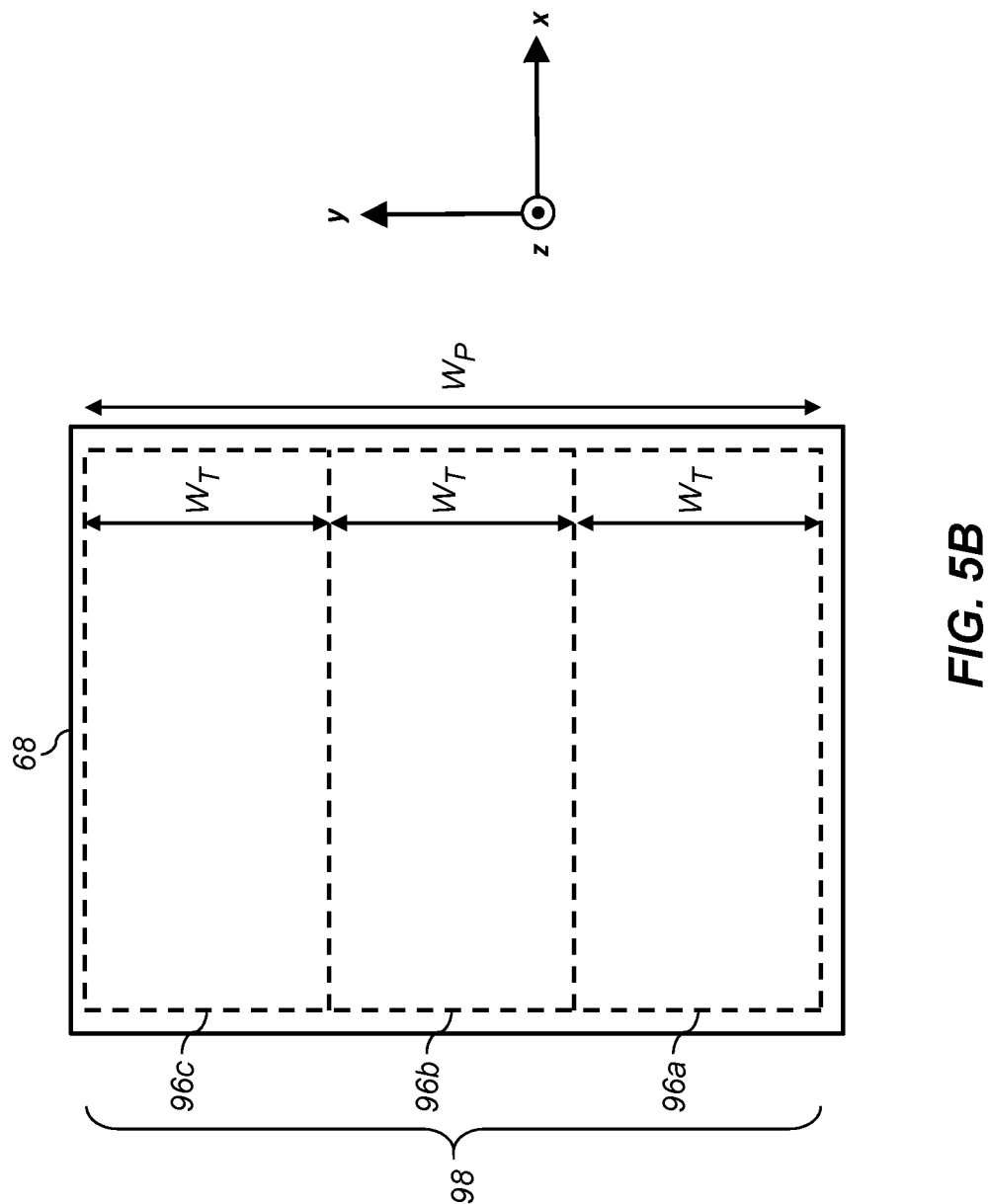

LARGE FORMAT ELECTROPHOTOGRAPHIC 3D PRINTER

CROSS-REFERENCE TO RELATED APPLICATIONS

This application claims the benefit of U.S. Provisional Patent Application No. 62/286,490, filed Jan. 25, 2016, which is incorporated herein by reference in its entirety.

FIELD OF THE INVENTION

This invention pertains to the field of additive manufacturing systems for printing three-dimensional parts and support structures, and more particularly to a system for printing three-dimensional parts with a large footprint.

BACKGROUND OF THE INVENTION

Additive manufacturing systems are used to build three-dimensional (3D) parts from digital representations of the 3D parts using one or more additive manufacturing techniques. Common forms of such digital representations would include the well-known AMF and STL file formats. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into a plurality of horizontal layers. For each sliced layer, a tool path is then generated, that provides instructions for the particular additive manufacturing system to form the given layer.

For example, in an extrusion-based additive manufacturing system, a 3D part (sometimes referred to as a 3D model) can be printed from the digital representation of the 3D part in a layer-by-layer manner by extruding a flowable part material. The part material is extruded through an extrusion tip carried by a printhead of the system, and is deposited as a sequence of layers on a substrate in an x-y plane. The extruded part material fuses to previously deposited part material, and solidifies upon a drop in temperature. The position of the printhead relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry defining the support structure for the overhanging or free-space segments of the 3D part being formed, and in some cases, for the sidewalls of the 3D part being formed. The support material adheres to the part material during fabrication, and is removable from the completed 3D part when the printing process is complete.

In two-dimensional (2D) printing, electrophotography (also known as xerography) is a technology for creating 2D images on planar substrates, such as printing paper and transparent substrates. Electrophotography systems typically include a conductive support drum coated with a photoconductive material layer, where latent electrostatic images are formed by electrostatic charging, followed by image-wise exposure of the photoconductive layer by an optical source. The latent electrostatic images are then moved to a developing station where toner is applied to charged areas, or alternatively to discharged areas of the photoconductive insulator to form visible images. The formed toner images are then transferred to substrates (e.g., printing paper) and affixed to the substrates with heat and/or pressure.

U.S. Pat. No. 9,144,940 to Martin, entitled "Method for printing 3D parts and support structures with electrophotography-based additive manufacturing," describes an electrophotography-based additive manufacturing method that is able to make a 3D part using a support material and a part material. The support material compositionally includes a first charge control agent and a first copolymer having aromatic groups, (meth)acrylate-based ester groups, carboxylic acid groups, and anhydride groups. The part material compositionally includes a second charge control agent, and a second copolymer having acrylonitrile units, butadiene units, and aromatic units.

The method described by Martin includes developing a support layer of the support structure from the support material with a first electrophotography engine, and transferring the developed support layer from the first electrophotography engine to a transfer medium. The method further includes developing a part layer of the 3D part from the part material with a second electrophotography engine, and transferring the developed part layer from the second electrophotography engine to the transfer medium. The developed part and support layers are then moved to a layer transfusion assembly with the transfer medium, where they are transfused together to previously-printed layers. While providing a new and speedy way to make a 3D part, the method of U.S. Pat. No. 9,144,940 is limited by the inability to make parts larger than the printing area of the electrophotography engine, and the associated transfer medium and transfusion assembly. It is well known in the art, that, unlike for example ink jet, it is very difficult to make wide electrophotography print engines due to the performance requirements of many of the electrophotography engine subsystems, such as the charging subsystem and the development subsystem. Maintaining good output uniformity over a distance of greater than about 20 inches is very difficult.

There remains a need to produce a part whose maximum footprint dimension can exceed 20 inches in both a width (cross-track) direction and a length (in-track) direction.

SUMMARY OF THE INVENTION

The present invention represents a method for constructing a three-dimensional part and a support structure with an electrophotography-based additive manufacturing system. The method includes:

a) providing a removable support material compositionally including support material particles;

b) providing a part material compositionally including part material particles;

c) developing a support layer of the support structure from the support material with a first electrophotography engine;

d) transferring the developed support layer from the first electrophotography engine to a transfer medium;

e) developing a part layer of the three-dimensional part from the part material with a second electrophotography engine;

f) transferring the developed part layer from the second electrophotography engine to the transfer medium, wherein the developed part and support layers have a maximum printing width in a cross-track direction and a maximum printing length in an in-track direction corresponding to a maximum printable area for the first and second electrophotography engines, respectively;

g) moving the transfer medium with the transferred part and support layers into alignment with a first tile region of a layer transfusion assembly;

h) transfusing the transferred part and support layers to previously-printed layers in the first tile region of the layer transfusion assembly;

i) repeating steps c)-f) to form second transferred part and support layers on the transfer medium;

j) moving the transfer medium with the second transferred part and support layers into alignment with a second tile region of the layer transfusion assembly, wherein the second tile region is shifted laterally relative to the first tile region; and k) transfusing the second transferred part and support layers to previously-printed layers in the second tile region of the layer transfusion assembly;

wherein a three-dimensional part region including the first and second tile regions is larger than the maximum printable area for the first and second electrophotography engines.

This invention has the advantage that 3D parts can be constructed having a footprint larger than the maximum printable area of the electrophotography engines.

BRIEF DESCRIPTION OF THE DRAWINGS

FIG. 5B illustrates a build platform including a 3D part region which is subdivided into three tile regions;

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
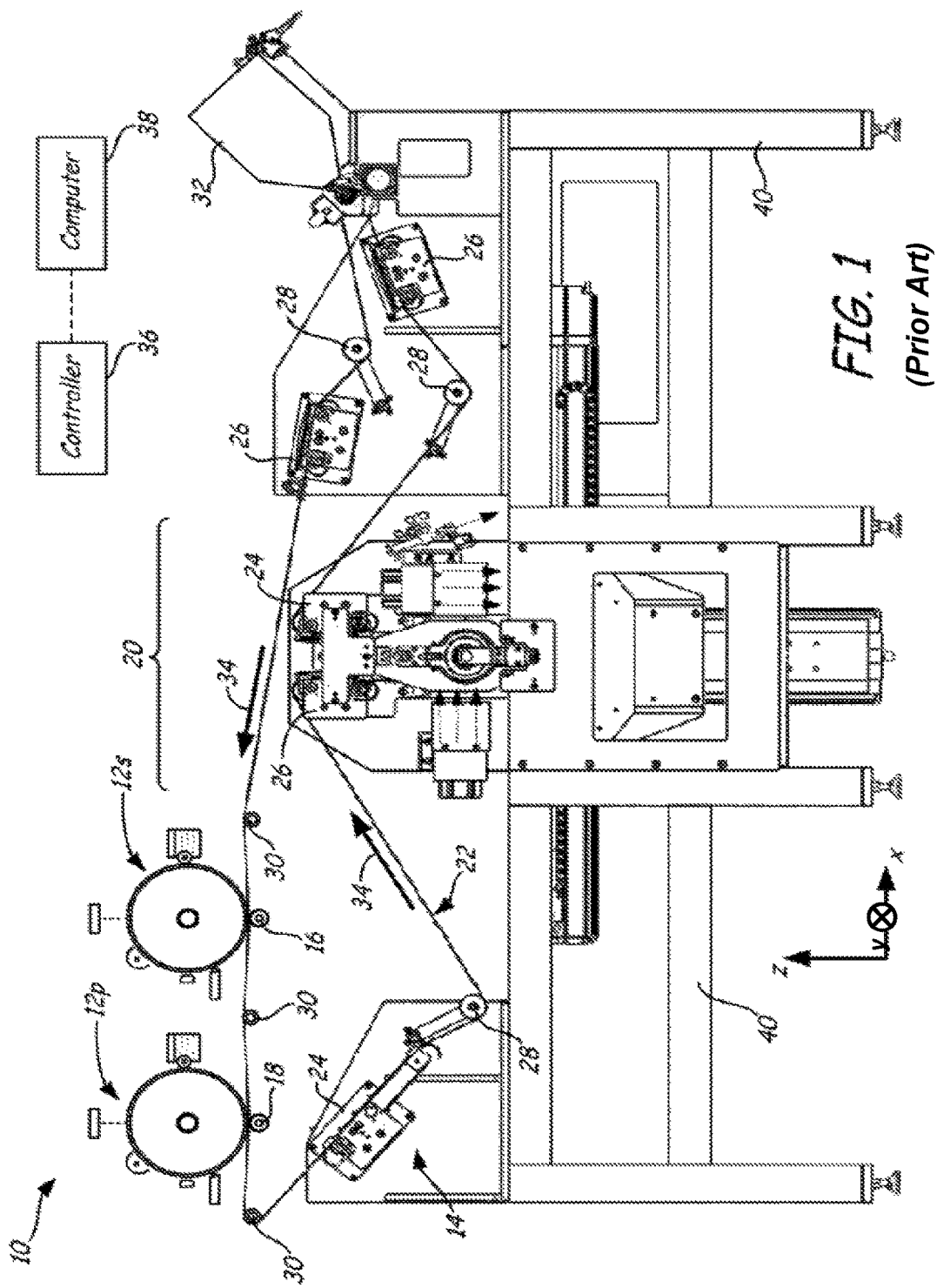
FIG. 1 is a schematic front view of an exemplary electrophotography-based additive manufacturing system for printing 3D parts and support structures from part and support materials.

FIGS. 1-4 illustrate an exemplary additive manufacturing system 10, which uses an electrophotography-based additive manufacturing process for printing 3D parts from a part material (e.g., an ABS part material), and associated support structures from a removable support material. As shown in FIG. 1, additive manufacturing system 10 includes a pair of electrophotography (EP) engines $12p$ and $12s$, belt transfer assembly 14, biasing mechanisms 16 and 18, and layer transfusion assembly 20.

Examples of suitable components and functional operations for additive manufacturing system 10 include those disclosed in U.S. Patent Application Publication 2013/0077996 to Hanson et al., entitled "Electrophotography-based additive manufacturing system with reciprocating operation;" in U.S. Patent Application Publication 2013/0077997 to Hanson et al., entitled "Electrophotography-based additive manufacturing system with transfer-medium service loop;" in U.S. Patent Application Publication 2013/0186549 to Comb et al., entitled "Layer transfusion for additive manufacturing;" and in U.S. Patent Application Publication 2013/0186558 to Comb et al., entitled "Layer transfusion with heat capacitor belt for additive manufacturing," each of which is incorporated herein by reference.

EP engines $12p$ and $12s$ are imaging engines for respectively imaging or otherwise developing layers of the part and support materials, where the part and support materials are each preferably engineered for use with the particular architecture of EP engine $12p$ and $12s$. The part material compositionally includes part material particles, and the support compositionally includes support material particles. In an exemplary embodiment, the support material compositionally includes support material particles including a first charge control agent and a first copolymer having aromatic groups, (meth)acrylate-based ester groups, carboxylic acid groups, and anhydride groups; and the part material compositionally includes part material particles including a second charge control agent, and a second copolymer having acrylonitrile units, butadiene units, and aromatic units. As discussed below, the developed part and support layers are transferred to belt transfer assembly 14 (or some other appropriate transfer medium) with biasing mechanisms 16 and 18, and carried to the layer transfusion assembly 20 to produce the 3D parts and associated support structures in a layer-by-layer manner.

In the illustrated configuration, belt transfer assembly 14 includes transfer belt 22, which serves as the transfer medium, belt drive mechanisms 24, belt drag mechanisms 26, loop limit sensors 28, idler rollers 30, and belt cleaner 32, which are configured to maintain tension on the transfer belt 22 while transfer belt 22 rotates in rotational direction 34. In particular, the belt drive mechanisms 24 engage and drive the transfer belt 22, and the belt drag mechanisms 26 function as brakes to provide a service loop design for protecting the transfer belt 22 against tension stress, based on monitored readings from the loop limit sensors 28.

Additive manufacturing system 10 also includes a controller 36, which includes one or more control circuits, microprocessor-based engine control systems, or digitally-controlled raster imaging processor systems, and which is configured to operate the components of additive manufacturing system 10 in a synchronized manner based on printing instructions received from a host computer 38. Host computer 38 includes one or more computer-based systems configured to communicate with controller 36 to provide the print instructions (and other operating information). For example, host computer 38 can transfer information to controller 36 that relates to the individual layers of the 3D parts and support structures, thereby enabling additive manufacturing system 10 to print the 3D parts and support structures in a layer-by-layer manner.

The components of additive manufacturing system 10 are typically retained by one or more frame structures, such as frame 40. Additionally, the components of additive manufacturing system 10 are preferably retained within an enclosable housing (not shown) that prevents ambient light from being transmitted to the components of additive manufacturing system 10 during operation.

Figure 2:
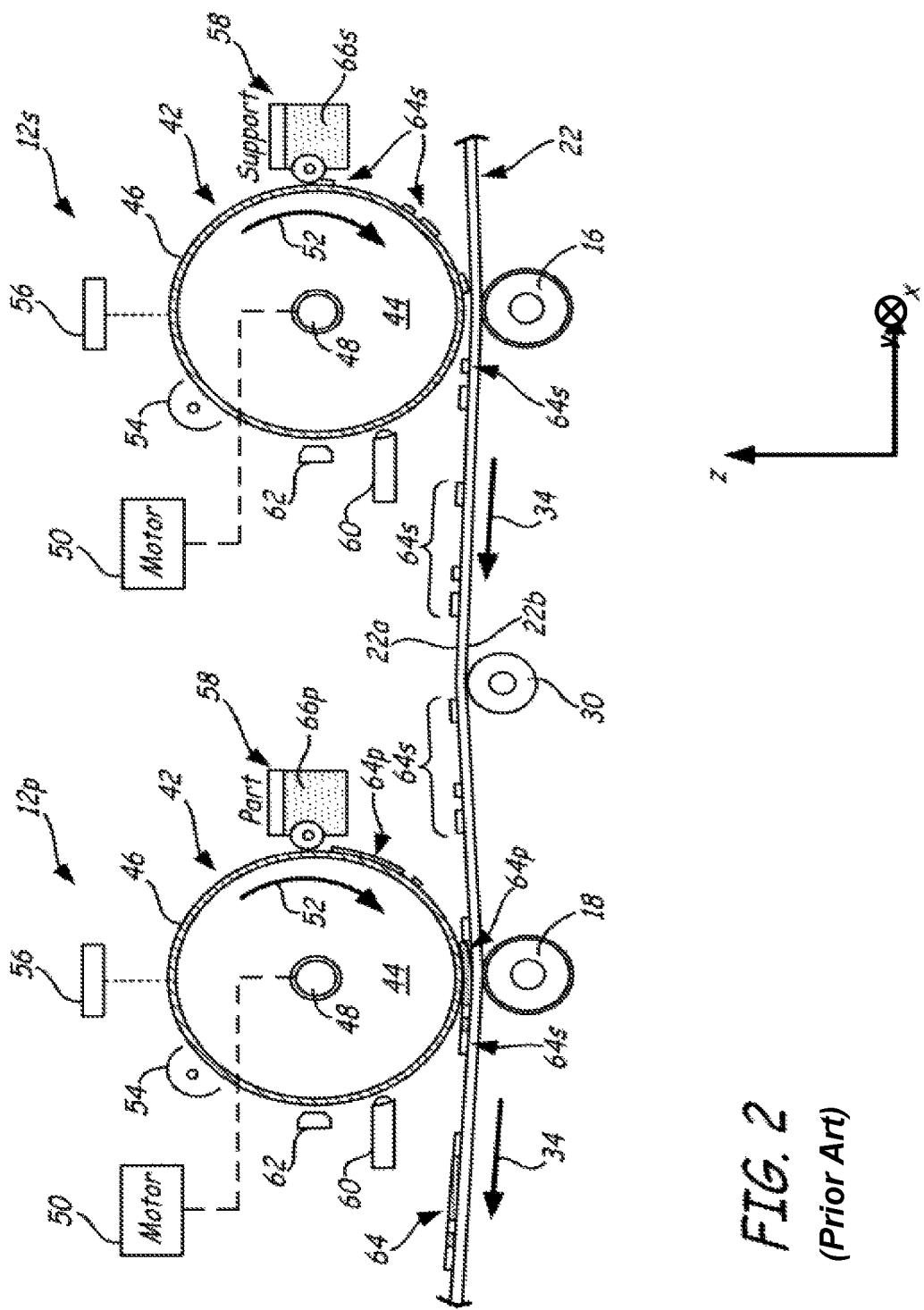
FIG. 2 is a schematic front view showing additional details of the electrophotography engines in the additive manufacturing system of FIG. 1.

FIG. 2 illustrates EP engines 12p and 12s in additional detail. EP engine 12s (i.e., the upstream EP engine relative to the rotational direction 34 of transfer belt 22) develops layers of support material 66s, and EP engine 12p (i.e., the downstream EP engine relative to the rotational direction 34 of transfer belt 22) develops layers of part material 66p. In alternative configurations, the arrangement of EP engines 12p and 12s can be reversed such that EP engine 12p is upstream from EP engine 12s relative to the rotational direction 34 of transfer belt 22. In other alternative configuration, additive manufacturing system 10 can include one or more additional EP engines for printing layers of additional materials.

In the illustrated configuration, EP engines 12p and 12s utilize identical components, including photoconductor drums 42, each having a conductive drum body 44 and a photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate the shaft 48 (and the photoconductor drum 42) in rotation direction 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, photoconductive surface 46 is configured to receive latent-charged images of the sliced layers of a 3D part or support structure (or negative images), and to attract charged particles of the part or support material of the present disclosure to the charged (or discharged image areas), thereby creating the layers of the 3D part and support structures.

As further shown, EP engines 12p and 12s also include charging device 54, imager 56, development station 58, cleaning station 60, and discharge device 62, each of which is in signal communication with controller 36. Charging device 54, imager 56, development station 58, cleaning station 60, and discharge device 62 accordingly define an image-forming assembly for surface 46 while drive motor 50 and shaft 48 rotate photoconductor drum 42 in the rotation direction 52.

In the illustrated example, the image-forming assembly for photoconductive surface 46 of EP engine 12s is used to form support material layers 64s of support material 66s, where a supply of support material 66s is retained by development station 58 of EP engine 12s, along with associated carrier particles. Similarly, the image-forming assembly for photoconductive surface 46 of EP engine 12p is used to form part material layers 64p of part material part material 66p, where a supply of part material 66p is retained by development station 58 of EP engine 12p, along with associated carrier particles.

Charging device 54 is configured to provide a uniform electrostatic charge on the photoconductive surface 46 as the photoconductive surface 46 rotates in the rotation direction 52 past the charging device 54. Suitable devices that can be used for the charging device 54 include corotrons, scorotrons, charging rollers, and other electrostatic devices.

Imager 56 is a digitally-controlled, pixel-wise light exposure apparatus configured to selectively emit electromagnetic radiation toward the uniform electrostatic charge on the photoconductive surface 46 as the photoconductive surface 46 rotates in the rotation direction 52 past the imager 56. The selective exposure of the electromagnetic radiation on the photoconductive surface 46 is controlled by the controller 36, and causes discrete pixel-wise locations of the electrostatic charge to be removed (i.e., discharged to ground), thereby forming latent image charge patterns on the photoconductive surface 46. The imager 56 in the EP engine 12p is controlled to provide a latent image charge pattern in accordance with a specified pattern for a particular part material layer 64p, and the imager 56 in the EP engine 12s is controlled to provide a latent image charge pattern in accordance with a specified pattern for a corresponding support material layer 64s.

Suitable devices for imager 56 include scanning laser light sources (e.g., gas or solid state lasers), light emitting diode (LED) array exposure devices, and other exposure device conventionally used in 2D electrophotography systems. In alternative embodiments, suitable devices for charging device 54 and imager 56 include ion-deposition systems configured to selectively deposit charged ions or electrons directly to the photoconductive surface 46 to form the latent image charge pattern. As such, as used herein, the term "electrophotography" includes "ionography."

Each development station 58 is an electrostatic and magnetic development station or cartridge that retains the supply of part material 66p or support material 66s, preferably in powder form, along with associated carrier particles. The development stations 58 typically function in a similar manner to single or dual component development systems and toner cartridges used in 2D electrophotography systems. For example, each development station 58 can include an enclosure for retaining the part material 66p or support material 66s and carrier particles. When agitated, the carrier particles generate triboelectric charges to attract the part material particles of the part material 66p or the support material particles of the support material 66s, which charges the attracted particles to a desired sign and magnitude, as discussed below.

Each development station 58 typically include one or more devices for transferring the charged part material 66p or support material 66s to the photoconductive surface 46, such as conveyors, fur brushes, paddle wheels, rollers or magnetic brushes. For instance, as the photoconductive surface 46 (having the latent image charge pattern) rotates past the development station 58 in the rotation direction 52, the particles of charged part material 66p or support material 66s are attracted to the appropriately charged regions of the latent image on the photoconductive surface 46, utilizing either charged area development or discharged area development (depending on the electrophotography mode being utilized). This creates successive part material layers 64p and support material layers 64s as the photoconductor drum 42 continues to rotate in the rotation direction 52, where the successive part material layers 64p and support material layers 64s correspond to the successive sliced layers of the digital representation of the 3D part and support structures.

The successive part material layers 64p and support material layers 64s are then rotated with photoconductive surfaces 46 in the rotation direction 52 to a transfer region in which the part material layers 64p and support material layers 64s are successively transferred from the photoconductor drums 42 to the transfer belt 22, as discussed below. While illustrated as a direct engagement between photoconductor drum 42 and transfer belt 22, in some preferred embodiments, EP engines 12p and 12s may also include intermediary transfer drums or belts, as discussed further below. The EP engines 12p and 12s are configured so that the part material layers 64p are transferred onto the transfer belt in registration with the corresponding support material layers 64s to provide combined layers 64.

After a given part material layer 64p or support material layer 64s is transferred from the photoconductor drum 42 to the transfer belt 22 (or an intermediary transfer drum or belt), drive motor 50 and shaft 48 continue to rotate the photoconductor drum 42 in the rotation direction 52 such that the region of the photoconductive surface 46 that previously held the developed layer passes the cleaning station 60. The cleaning station 60 is configured to remove any residual, non-transferred portions of part material 66p or support material 66s from the photoconductive surface 46. Suitable types of cleaning devices for use in the cleaning station 60 include blade cleaners, brush cleaners, electrostatic cleaners, vacuum-based cleaners, and combinations thereof.

After passing the cleaning station 60, the photoconductive surface 46 continues to rotate in the rotation direction 52 such that the cleaned regions of the photoconductive surface 46 pass by the discharge device 62 to remove any residual electrostatic charge on photoconductive surface 46 prior to starting the next cycle. Suitable types of discharge devices 62 include optical systems, high-voltage alternating-current corotrons and/or scorotrons, one or more rotating dielectric rollers having conductive cores with applied high-voltage alternating-current, and combinations thereof.

The transfer belt 22 is a transfer medium for transporting the developed part material layers 64p and support material layers 64s from photoconductor drum 42 (or an intermediary transfer drum or belt) to the layer transfusion assembly 20 (FIG. 1). Examples of suitable types of transfer belts 22 include those disclosed in Comb et al. in the aforementioned U.S. Patent Application Publication 2013/0186549 and U.S. Patent Application Publication 2013/0186558 by Comb et al. The transfer belt 22 includes a front surface 22a and a rear surface 22b, where the front surface 22a faces the photoconductive surfaces 46 of photoconductor drums 42 and the rear surface 22b is in contact with biasing mechanisms 16 and 18.

Biasing mechanisms 16 and 18 are configured to induce electrical potentials through transfer belt 22 to electrostatically attract the part material layers 64p and support material layers 64s from EP engines 12p and 12s, respectively, to the transfer belt 22. Because the part material layers 64p and support material layers 64s each represent only a single layer increment in thickness at this point in the process, electrostatic attraction is suitable for transferring the part material layers 64p and support material layers 64s from the EP engines 12p and 12s to the transfer belt 22.

Preferably, the controller 36 rotates the photoconductor drums 42 of EP engines 12p and 12s at the same rotational rates, such that the tangential velocity of the photoconductive surfaces 46 are synchronized with the line speed of the transfer belt 22 (as well as with any intermediary transfer drums or belts). This allows the additive manufacturing system 10 to develop and transfer the part material layers 64p and support material layers 64s in coordination with each other from separate developed images. In particular, as shown, each part material layer 64p is transferred to transfer belt 22 in proper registration with each support material layer 64s to produce the combined layer 64. As discussed below, this allows the part material layers 64p and support material layers 64s to be transfused together. To enable this, the part material 66p and support material 66s preferably have thermal properties and melt rheologies that are the same or substantially similar. Within the context of the present invention, "substantially similar thermal properties and melt rheologies" should be interpreted to be within 20% of regularly measured properties such as glass transition temperature, melting point and melt viscosity. As can be appreciated, some combined layers 64 transported to layer transfusion assembly 20 may only include support material 66s or may only include part material 66p, depending on the particular support structure and 3D part geometries and layer slicing.

In an alternative and generally less-preferred configuration, part material layers 64p and support material layers 64s may optionally be developed and transferred along transfer belt 22 separately, such as with alternating part material layers 64p and support material layers 64s. These successive, alternating layers 64p and 64s may then be transported to layer transfusion assembly 20, where they may be transfused separately to print the 3D part and support structure.

Figure 3:
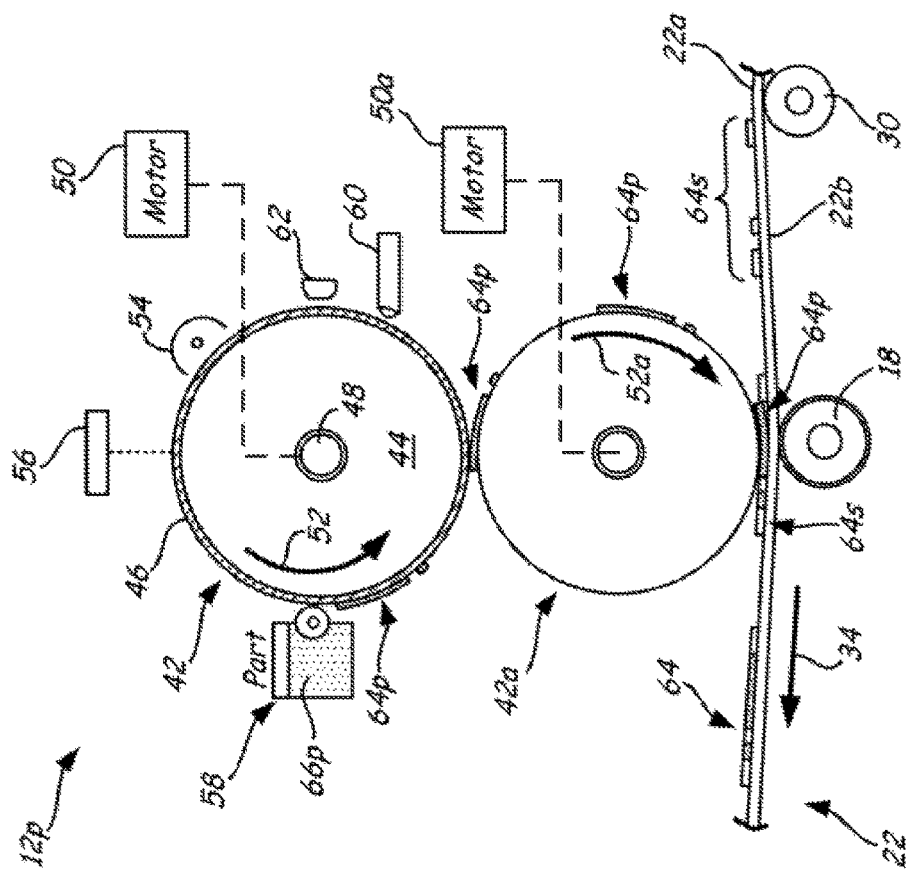
FIG. 3 is a schematic front view showing an alternative electrophotography engine, which includes an intermediary drum or belt.

In some configurations, one or both of EP engines 12p and 12s can also include one or more intermediary transfer drums or belts between the photoconductor drum 42 and the transfer belt 22. For example, FIG. 3 illustrates an alternate configuration for an EP engine 12p that also includes an intermediary drum 42a. The intermediary drum 42a rotates in a rotation direction 52a opposite to the rotation direction 52, under the rotational power of drive motor 50a. Intermediary drum 42a engages with photoconductor drum 42 to receive the developed part material layers 64p from the photoconductor drum 42, and then carries the received part material layers 64p and transfers them to the transfer belt 22.

In some configurations, the EP engine 12s (FIG. 2) can use a same arrangement using an intermediary drum 42a for carrying the developed support material layers 64s from the photoconductor drum 42 to the transfer belt 22. The use of such intermediary transfer drums or belts for EP engines 12p and 12s can be beneficial for thermally isolating the photoconductor drum 42 from the transfer belt 22, if desired.

Figure 4:
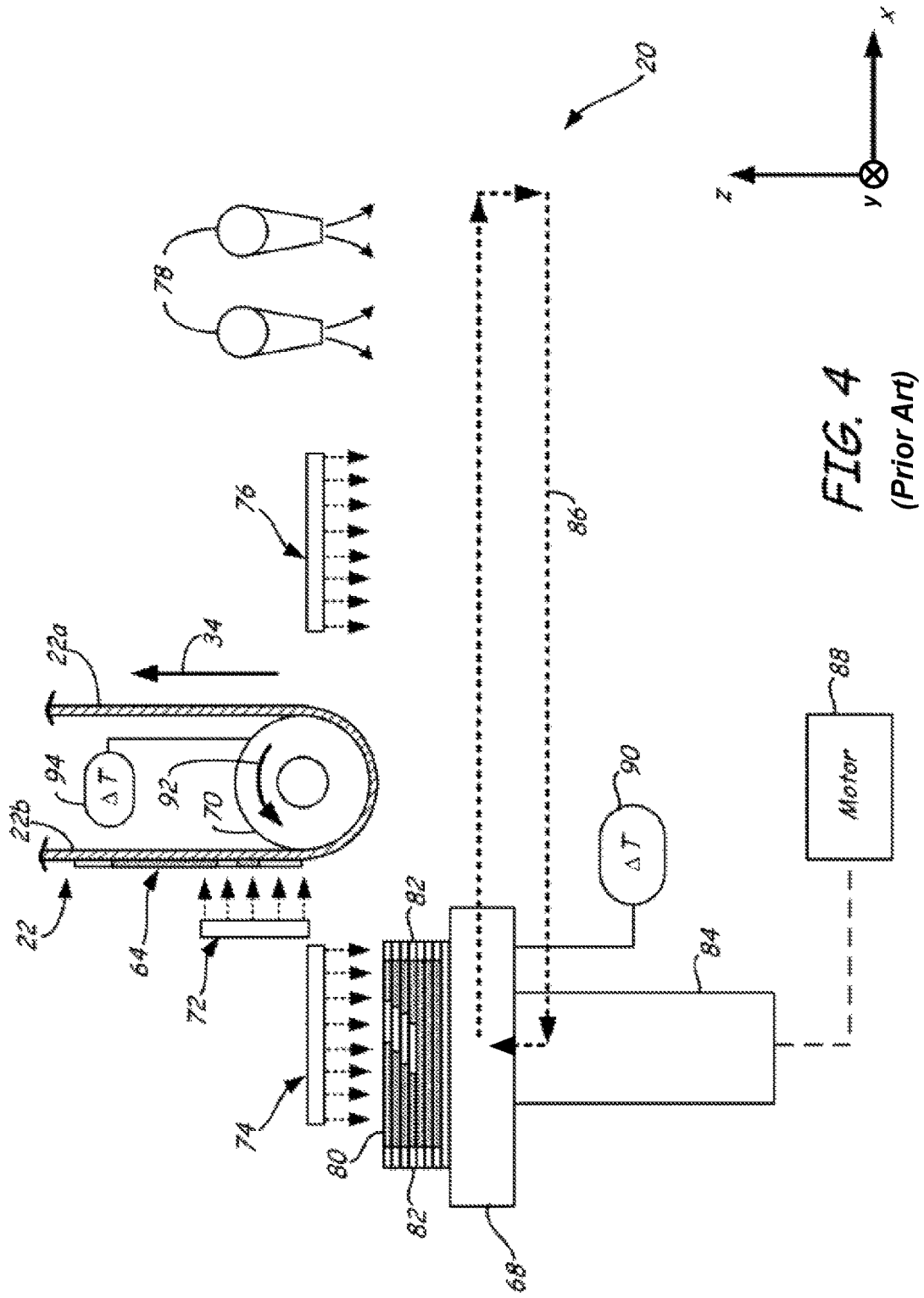
FIG. 4 is a schematic front view illustrating a layer transfusion assembly for performing layer transfusion steps.

FIG. 4 illustrates an exemplary configuration for the layer transfusion assembly 20. As shown, the layer transfusion assembly 20 includes build platform 68, nip roller 70, heaters 72 and 74, post-fuse heater 76, and air jets 78 (or other cooling units). Build platform 68 is a platform assembly or platen that is configured to receive the heated combined layers 64 (or separate part material layers 64p and support material layers 64s) for printing a 3D part 80 and support structure 82, in a layer-by-layer manner. In some configurations, the build platform 68 may include removable film substrates (not shown) for receiving the combined layers 64, where the removable film substrates may be restrained against build platform using any suitable technique (e.g., vacuum drawing, removable adhesive, mechanical fastener, and the like).

The build platform 68 is supported by gantry 84, which is a gantry mechanism configured to move build platform 68 along the z-axis and the x-axis in a reciprocating rectangular motion pattern 86, where the primary motion is back-and-forth along the x-axis. Gantry 84 may be operated by a motor 88 based on commands from the controller 36, where the motor 88 can be an electrical motor, a hydraulic system, a pneumatic system, or the like.

In the illustrated configuration, the build platform 68 is heatable with heating element 90 (e.g., an electric heater). Heating element 90 is configured to heat and maintain the build platform 68 at an elevated temperature that is greater than room temperature (e.g., about 25° C.), such as at a desired average part temperature of 3D part 80 and support structure 82, as discussed by Comb et al. in the aforementioned U.S. Patent Application Publication 2013/0186549 and U.S. Patent Application Publication 2013/0186558. This allows build platform 68 to assist in maintaining the 3D part 80 and support structure 82 at the desired average part temperature.

Nip roller 70 is a heatable element or a heatable layer transfusion element, which is configured to rotate around a fixed axis with the movement of transfer belt 22. In particular, nip roller 70 may roll against the rear surface 22b in rotation direction 92 while the transfer belt 22 rotates in the rotation direction 34. In the illustrated configuration, nip roller 70 is heatable with heating element 94 (e.g., an electric heater). Heating element 94 is configured to heat and maintain nip roller 70 at an elevated temperature that is greater than the room temperature (e.g., 25° C.), such as at a desired transfer temperature for combined layers 64.

Heater 72 includes one or more heating device (e.g., an infrared heater or a heated air jet) configured to heat the combined layers 64 to a temperature near an intended transfer temperature of the part material 66p and support material 66s, such as at least a fusion temperature of the part material 66p and support material 66s, preferably prior to reaching nip roller 70. Each combined layer 64 preferably passes by (or through) heater 72 for a sufficient residence time to heat the combined layer 64 to the intended transfer temperature. Heater 74 may function in the same manner as heater 72, and heats the top surfaces of 3D part 80 and support structure 82 to an elevated temperature, such as at the same transfer temperature as the heated combined layers 64 (or other suitable elevated temperature).

As mentioned above, the support material 66s used to print support structure 82 preferably has thermal properties (e.g., glass transition temperature) and a melt rheology that are similar to or substantially the same as the thermal properties and the melt rheology of the part material 66p used to print 3D part 80. This enables the part material 66p of the part material layer 64p and the support material 66s of the support material layer 64s to be heated together with heater 74 to substantially the same transfer temperature, and also enables the part material 66p and support material 66s at the top surfaces of 3D part 80 and support structure 82 to be heated together with heater 74 to substantially the same temperature. Thus, the part material layers 64p and the support material layers 64s can be transfused together to the top surfaces of 3D part 80 and support structure 82 in a single transfusion step as combined layer 64. This single transfusion step for transfusing the combined layer 64 is typically impractical without sufficiently matching the thermal properties and the melt rheologies of the part material 66p and support material 66s.

Post-fuse heater 76 is located downstream from nip roller 70 and upstream from air jets 78, and is configured to heat the transfused layers to an elevated temperature to perform a post-fuse or heat-setting operation. Again, the similar thermal properties and melt rheologies of the part and support materials enable the post-fuse heater 76 to post-heat the top surfaces of 3D part 80 and support structure 82 together in a single post-fuse step.

Prior to printing 3D part 80 and support structure 82, build platform 68 and nip roller 70 may be heated to their desired temperatures. For example, build platform 68 may be heated to the average part temperature of 3D part 80 and support structure 82 (due to the similar melt rheologies of the part and support materials). In comparison, nip roller 70 may be heated to a desired transfer temperature for combined layers 64 (also due to the similar thermal properties and melt rheologies of the part and support materials).

During the printing operation, transfer belt 22 carries a combined layer 64 past heater 72, which may heat the combined layer 64 and the associated region of transfer belt 22 to the transfer temperature. Suitable transfer temperatures for the part and support materials include temperatures that exceed the glass transition temperatures of the part material 66p and the support material 66s, which are preferably similar or substantially the same, and where the part material 66p and support material 66s of combined layer 64 are softened but not melted (e.g., to a temperature ranging from about 140° C. to about 180° C. for an ABS part material).

As further shown in the exemplary configuration of FIG. 4, during operation, gantry 84 moves the build platform 68 (with 3D part 80 and support structure 82) in a reciprocating rectangular motion pattern 86. In particular, the gantry 84 moves build platform 68 along the x-axis below, along, or through heater 74. Heater 74 heats the top surfaces of the 3D part 80 and support structure 82 to an elevated temperature, such as the transfer temperatures of the part and support materials. As discussed by Comb et al. in the aforementioned U.S. Patent Application Publication 2013/0186549 and U.S. Patent Application Publication 2013/0186558, heaters 72 and 74 can heat the combined layers 64 and the top surfaces of the 3D part 80 and support structure 82 to about the same temperatures to provide a consistent transfusion interface temperature. Alternatively, heaters 72 and 74 can heat the combined layers 64 and the top surfaces of the 3D part 80 and support structure 82 to different temperatures to attain a desired transfusion interface temperature.

The continued rotation of transfer belt 22 and the movement of build platform 68 align the heated combined layer 64 with the heated top surfaces of the 3D part 80 and support structure 82 with proper registration along the x-axis. The gantry 84 continues to move the build platform 68 along the x-axis at a rate that is synchronized with the tangential velocity of the transfer belt 22 (i.e., the same directions and speed). This causes rear surface 22b of the transfer belt 22 to rotate around nip roller 70 and brings the heated combined layer 64 into contact with the top surfaces of 3D part 80 and support structure 82. This presses the heated combined layer 64 between the front surface 22a of the transfer belt 22 and the heated top surfaces of 3D part 80 and support structure 82 at the location of nip roller 70, which at least partially transfuses the heated combined layer 64 to the top layers of 3D part 80 and support structure 82.

As the transfused combined layer 64 passes the nip of nip roller 70, the transfer belt 22 wraps around nip roller 70 to separate and disengage the transfer belt from the build platform 68. This assists in releasing the transfused combined layer 64 from the transfer belt 22, enabling the transfused combined layer 64 to remain adhered to the 3D part 80 and the support structure 82, thereby adding a new layer to the 3D part and the support structure 82. Maintaining the transfusion interface temperature at a transfer temperature that is higher than the glass transition temperatures of the part and support materials, but lower than their fusion temperatures, enables the heated combined layer 64 to be hot enough to adhere to 3D part 80 and support structure 82, while also being cool enough to readily release from transfer belt 22. Additionally, as discussed earlier, the similar thermal properties and melt rheologies of the part and support materials allow them to be transfused in the same step.

After release, the gantry 84 continues to move the build platform 68 along the x-axis to the post-fuse heater 76. At the post-fuse heater 76, the top-most layers of 3D part 80 and support structure 82 (including the transfused combined layer 64) are preferably heated to at least the fusion temperature of the part and support materials in a post-fuse or heat-setting step. This melts the part and support materials of the transfused layer 64 to a highly fusible state such that polymer molecules of the transfused layer 64 quickly interdiffuse to achieve a high level of interfacial entanglement with the 3D part 80 and the support structure 82.

The gantry 84 continues to move the build platform 68 along the x-axis past post-fuse heater 76 to air jets 78, the air jets 78 blow cooling air towards the top layers of 3D part 80 and support structure 82. This actively cools the transfused layer 64 down to the average part temperature, as discussed by Comb et al. in the aforementioned U.S. Patent Application Publication 2013/0186549 and U.S. Patent Application Publication 2013/0186558.

To assist in keeping 3D part 80 and support structure 82 at the desired average part temperature, in some arrangements, one or both of the heater 74 and post-heater 76 can be configured to operate to heat only the top-most layers of 3D part 80 and support structure 82. For example, in embodiments in which heaters 72, 74 and 76 are configured to emit infrared radiation, 3D part 80 and support structure 82 can include heat absorbers or other colorants configured to restrict penetration of the infrared wavelengths to within only the top-most layers. Alternatively, heaters 72, 74 and 76 can be configured to blow heated air across the top surfaces of 3D part 80 and support structure 82. In either case, limiting the thermal penetration into 3D part 80 and support structure 82 allows the top-most layers to be sufficiently transfused, while also reducing the amount of cooling required to keep 3D part 80 and support structure 82 at the desired average part temperature.

The EP engines 12p and 12s have an associated maximum printable area. For example, the EP engines in the NexPress SX3900 have a maximum printing width in the cross-track direction (i.e., the y-direction) of about 340 mm, and a maximum printing length in the in-track direction (i.e., the x-direction) of about 904 mm. When building a 3D part 80 and support structure 82 having a footprint that is smaller than the maximum printable area of the EP engines 12p and 12s, the gantry 84 next actuates the build platform 68 downward, and moves the build platform 68 back along the x-direction following the reciprocating rectangular motion pattern 86 to an appropriate starting position in the x-direction in proper registration for transfusing the next combined layer 64. In some embodiments, the gantry 84 may also actuate the build platform 68 with the 3D part 80 and support structure 82 upward to bring it into proper registration in the z-direction for transfusing the next combined layer 64. (Generally the upward movement will be smaller than the downward movement to account for the thickness of the previously printed layer.) The same process is then repeated for each layer of 3D part 80 and support structure 82.

Figure 5A:
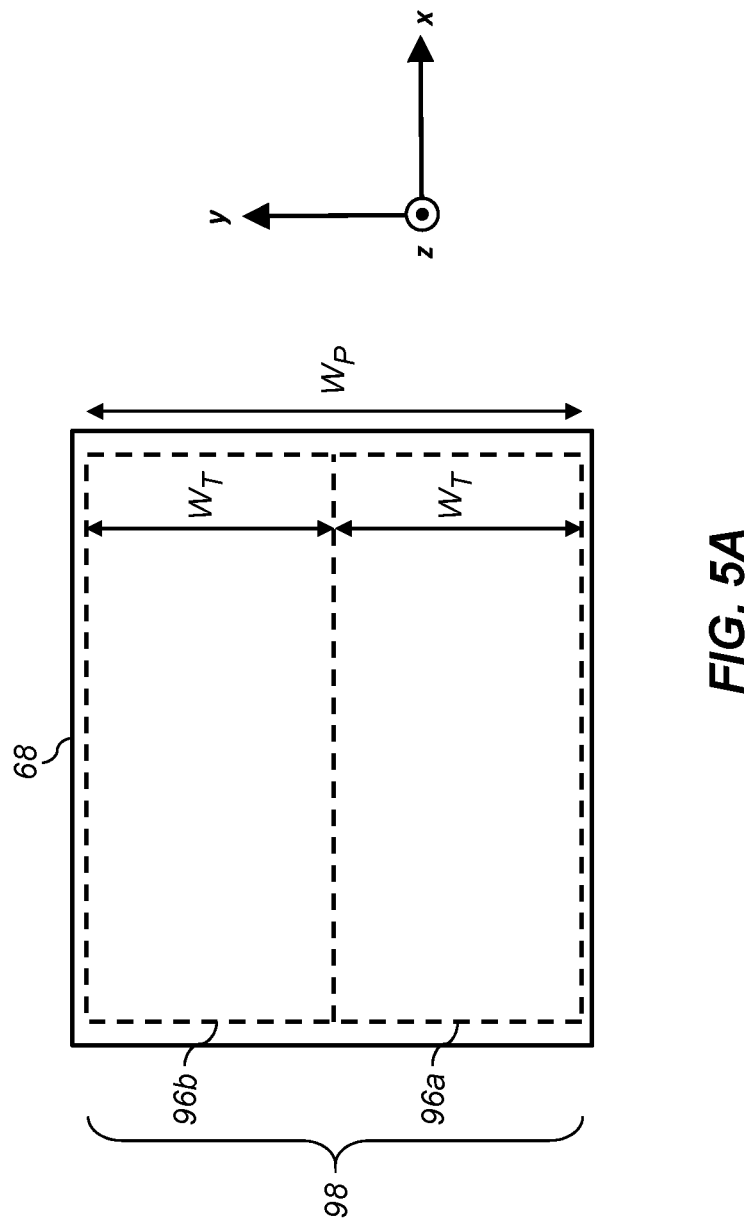
FIG. 5A illustrates a build platform including a 3D part region which is subdivided into two tile regions.

In prior art arrangements, the size of the 3D parts 80 that could be fabricated was limited by the maximum printable area of the EP engines 12p and 12s. It would be very costly to develop specially designed EP engines 12p and 12s having maximum printable areas that are larger than those used in typical printing systems. Embodiments of the present invention provide a solution in which the additive manufacturing system 10 can be used to build a 3D part 80 and support structure 82 having a footprint that is larger than the than the maximum printable area of the EP engines 12p and 12s. This is accomplished by utilizing a layer transfusion assembly 20 having a build platform 68 that is at least as large as the footprint of the 3D part 80 and support structure 82. The build surface of the build platform 68 can then be subdivided into a set of tiles, each of which is smaller than the maximum printable image size that can be produced by the EP engines 12p and 12s. For example, FIG. 5A illustrates a top view of a build platform 68 which is sub-divided into two tile regions 96a and 96b, where the second tile region 96b is shifted laterally relative to the first tile region 96a. Each of the tile regions 96a and 96b has a width $W_T$ in the y-direction that is that is less than or equal to the maximum printing width of the EP engines 12p and 12s. But taken together, they define a 3D part region 98 having a width $W_P$ in the y-direction that is larger than the maximum printing width of the EP engines 12p and 12s.

The arrangement of FIG. 5A enables the construction of a 3D part 80 and support structure 82 that is up to twice the maximum printable width of the EP engines 12p and 12s. To build 3D parts 80 and support structures 82 using this arrangement, the build platform 68 is positioned such that the transfer belt 22 is aligned with the first tile region 96a. The layer transfusion assembly 20 is then controlled as described above to transfuse a layer of the 3D part 80 and support structure 82 in the first tile region 96a. The gantry 84 then moves the build platform 68 back along the x-direction to an appropriate starting position in the x-direction, and also moves the build platform 68 laterally in the negative y-direction (i.e., the cross-track direction) such that the transfer belt 22 is now aligned with the second tile region 96b. The gantry 84 preferably moves the build platform 68 simultaneously in both the x- and y-directions to minimize the transit time. The layer transfusion assembly 20 is then controlled as described above to transfuse a layer of the 3D part 80 and support structure 82 in the second tile region 96b. This process is then repeated to build up the 3D part 80 and support structure 82 in a layer-by-layer manner, with the gantry 84 alternating its return movement in the y-direction, first in the positive y-direction to bring the transfer belt 22 into alignment with the first tile region 96a, and then in the negative y direction to bring the transfer belt 22 into alignment with the second tile region 96b.

One skilled in the art will recognize that the arrangement of FIG. 5A can be generalized to utilize more than two tile regions 96a, 96b. For example, FIG. 5B illustrates an arrangement where the 3D part region 98 is made up of three tile regions 96a, 96b, 96c distributed across the width of the build platform 68 in the cross-track direction. The enables the construction of a 3D part 80 and support structure 82 that is up to three times the maximum printable width of the EP engines 12p and 12s. In this case, the gantry 84 would be controlled such that the build platform 68 would be cycled between three starting positions to construct the portions of the 3D part 80 and support structure 82 in the three tile regions 96a, 96b, 96c in a layer-by-layer manner.

Figure 5C:
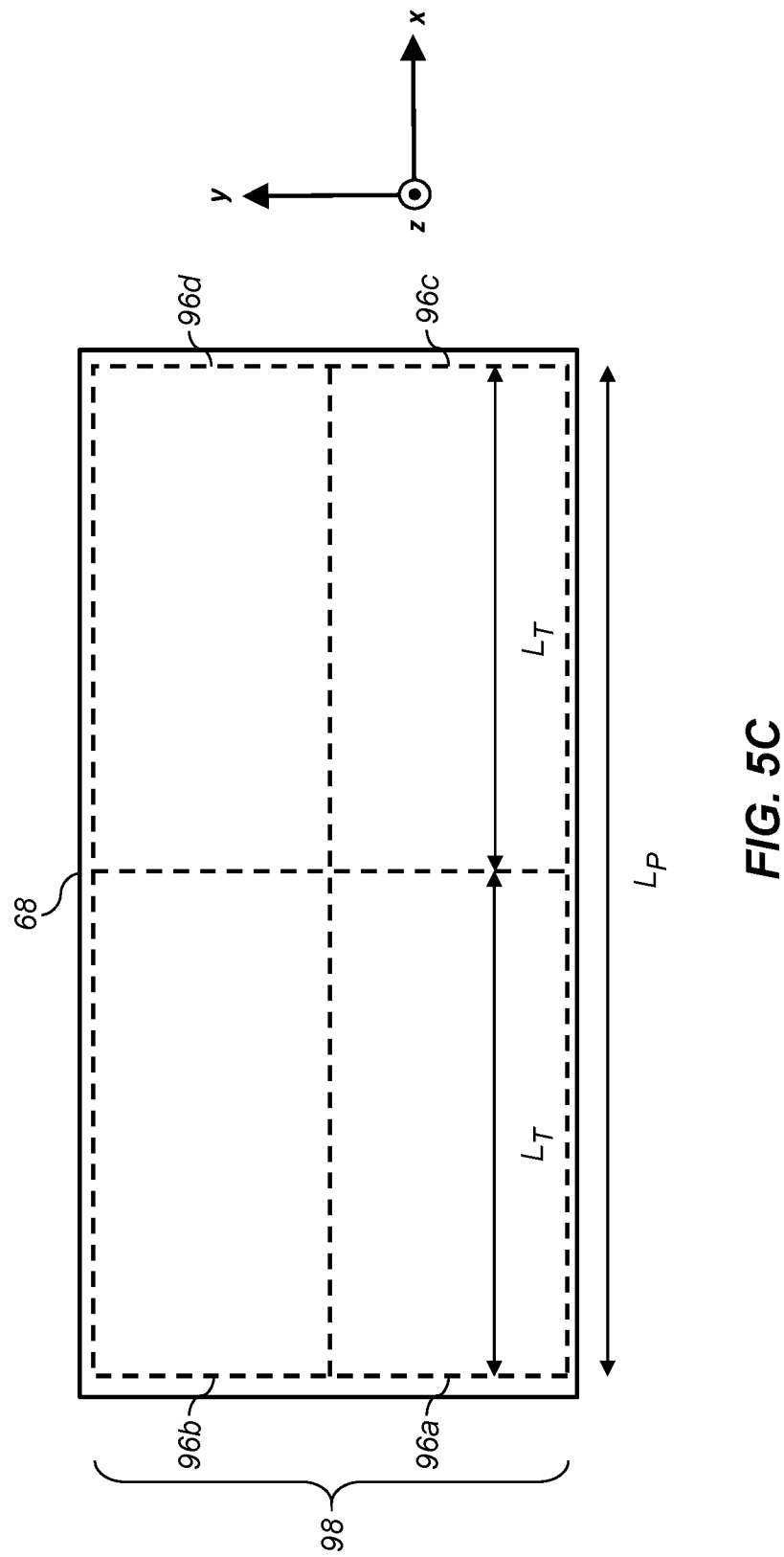
FIG. 5C illustrates a build platform including a 3D part region which is subdivided into four tile regions.

In some cases, the EP engines 12p and 12s can have a maximum printing length that is smaller than the desired size of the 3D part 80 and support structure 82. FIG. 5C illustrates another exemplary configuration where the 3D part region 98 is made up of four tile regions 96a, 96b, 96c, 96d arranged in a 2×2 array. Each of the tile regions 96a, 96b, 96c, 96d has a length $L_T$ in the x-direction that is less than or equal to the maximum printing length of the EP engines 12p and 12s. But taken together, they define a 3D part region 98 having a length $L_P$ in the x-direction that is larger than the maximum printing length of the EP engines 12p and 12s. In this case, the gantry 84 would be controlled such that the build platform 68 would be cycled between four starting positions which vary in both the in-track x-direction and the cross-track y-direction to print the portions of the 3D part 80 and support structure 82 in three tile regions 96a, 96b, 96c, 96d in a layer-by-layer manner. This exemplary arrangement enables the construction of a 3D part 80 and support structure 82 that is up to twice the maximum printable width and up to twice the maximum printable length of the EP engines 12p and 12s.

In some arrangements, the 3D part 80 constructed by the additive manufacturing system 10 is encased laterally (i.e., in the x- and y-dimensions of the build plane) within the support structure 82, such as shown in FIG. 4. This has the advantage that it provides improved dimensional integrity and surface quality for the 3D part 80 when using a layer transfusion assembly 20 having a reciprocating build platform 68 and nip roller 70.

After the construction operation is completed, the resulting 3D part 80 and support structure 82 can be removed from additive manufacturing system 10 and undergo one or more post-printing operations. For example, support structure 82 derived from the support material 66s can be sacrificially removed from the 3D part 80, such as by using an appropriate aqueous-based solution (e.g., an aqueous alkali solution). Using this technique, support structure 82 may at least partially dissolved in the solution, separating it from 3D part 80 in a hands-free manner. In such cases, the support material 66s is chosen to be soluble in the aqueous-based solution while the part material 66p is chosen to be insoluble.

Figure 6:
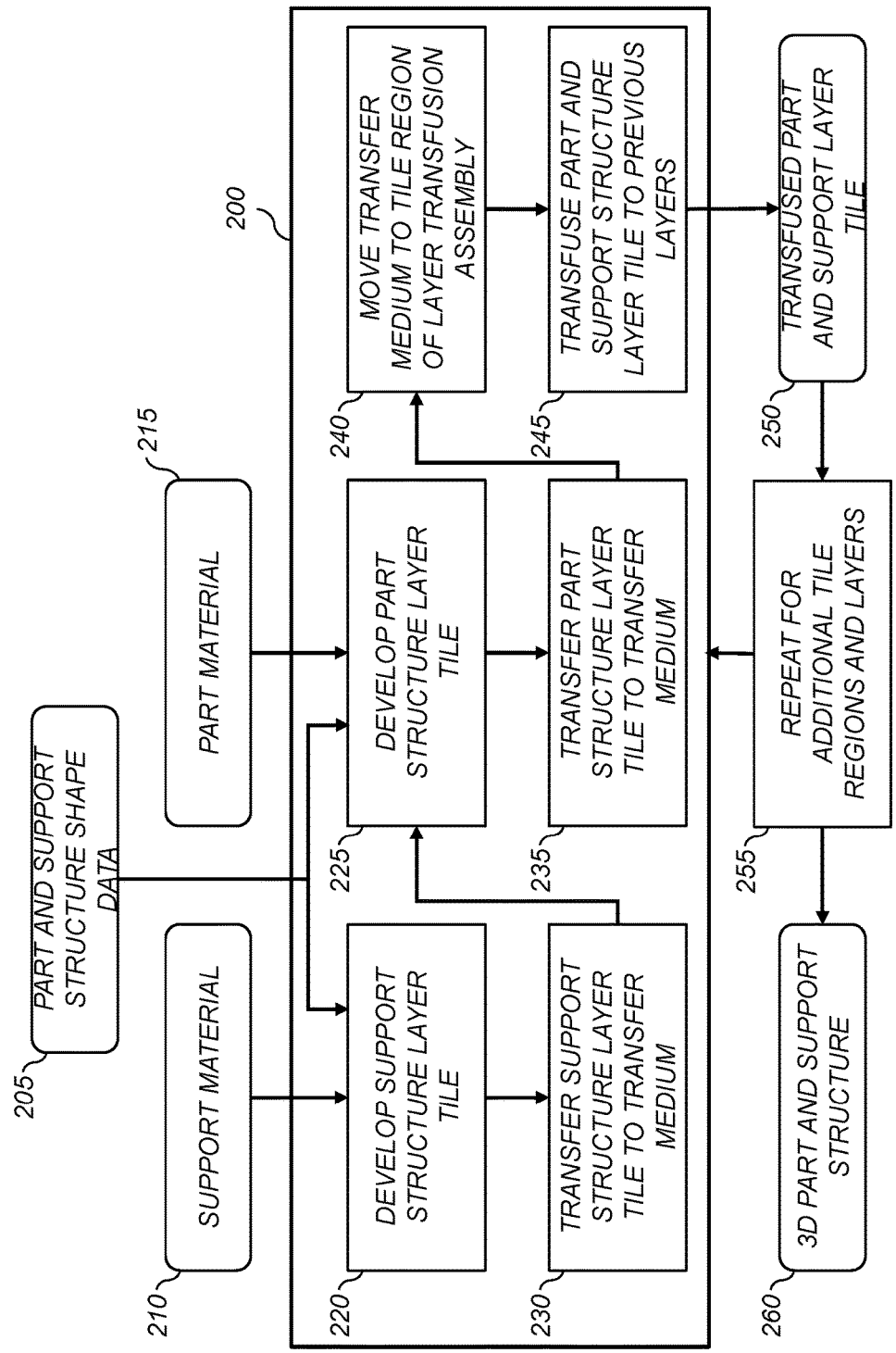
FIG. 6 is a flowchart showing a method for constructing a 3D part and support structure in accordance with an exemplary embodiment.

FIG. 6 shows a flow chart summarizing a method for constructing a 3D part and support structure 260 from a support material 210 and a part material 215 using the previously described additive manufacturing system 10 (FIG. 1) in accordance with the present invention. The part to be constructed is specified using part and support structure shape data 205, which is a digital representation specifying the desired shape of the 3D part and support structure 260. Common forms of such digital representations would include the well-known AMF and STL file formats.

The 3D part and support structure 260 is formed in a layer-by-layer and tile-by-tile manner using a layer tile formation process 200. A develop support structure layer tile step 220 is used to develop a support material layer 64s (FIG. 2) of the support structure 82 (FIG. 4) from the support material 66s (FIG. 2) corresponding to the content to be constructed in a first tile (e.g., tile region 96a of FIG. 5A) using a first EP engine 12s (FIG. 2). The developed support material layer 64s is transferred from the first EP engine 12s to a transfer belt 22 (FIG. 2), or some other appropriate transfer medium, using a transfer support structure layer tile to transfer medium step 230. Similarly, a develop part structure layer tile step 225 is used to develop a part material layer 64p (FIG. 2) of the 3D part 80 (FIG. 4) from the part material 66p (FIG. 2) corresponding to the content to be constructed in the first tile using a second EP engine 12p (FIG. 2). The developed part material layer 64p is then transferred from the second EP engine 12p to the transfer belt 22 using a transfer part structure layer tile to transfer medium step 235. As discussed earlier, the developed part material layer 64p is preferably transferred to the transfer belt 22 in registration with the developed support material layer 64s to form a combined layer 64 (FIG. 2).

A move transfer medium to tile region of layer transfusion assembly step 240 is then used to move the transfer medium (e.g., transfer belt 22) bearing the developed part material layer 64p and developed support material layer 64s to a layer transfusion assembly 20 (FIG. 4). The transfer belt 22 is aligned with an appropriate starting position for a first tile region (e.g., tile region 96a of FIG. 5A) of the build platform 68 of the layer transfusion assembly 20. A transfuse part and support structure layer tile to previous layers step 245 is then used to transfuse the developed part material layer 64p and developed support material layer 64s, adding a layer to the 3D part 80 and support structure 82 in that tile region, providing a transfused part and support layer tile 250.

A repeat for additional tile regions and layers step 255 is used to repeat the layer tile formation process 200 for each of the tile regions (e.g., tile regions 96a, 96b) that make up the 3D part region (FIG. 5A), and for each of the layers that make up the 3D part 80 and support structure 82, with the transfer belt 22 being aligned with the starting position for the appropriate tile region each time. After repeating the layer tile formation process 200 for all of the tile regions and all of the layers, the resulting 3D part and support structure 260 is removed from the additive manufacturing system 10 and post-printing operations can be used to remove the support structure 82, leaving the final 3D part 80.

The invention has been described in detail with particular reference to certain preferred embodiments thereof, but it will be understood that variations and modifications can be effected within the spirit and scope of the invention.

PARTS LIST 10 additive manufacturing system
12p electrophotography (EP) engine
12s electrophotography (EP) engine
14 belt transfer assembly
16 biasing mechanism
18 biasing mechanism
20 layer transfusion assembly
22 transfer belt
22a front surface
22b rear surface
24 belt drive mechanism
26 belt drag mechanism
28 loop limit sensor
30 idler roller
32 belt cleaner
34 rotational direction
36 controller
38 host computer
40 frame
42 photoconductor drum
42a intermediary drum
44 conductive drum body
46 photoconductive surface
48 shaft
50 drive motor
50a drive motor
52 rotation direction
52a rotation direction
54 charging device
56 imager
58 development station 60 cleaning station
62 discharge device
64 combined layer
64p part material layer
64s support material layer
66p part material
66s support material
68 build platform
70 nip roller
72 heater
74 heater
76 post-fuse heater
78 air jets
80 3D part
82 support structure
84 gantry
86 motion pattern
88 motor
90 heating element
92 rotation direction
94 heating element
96a tile region
96b tile region
96c tile region
96d tile region
98 3D part region
200 layer tile formation process
205 part and support structure shape data
210 support material
215 part material
220 develop support structure layer tile step
225 develop part structure layer tile step
230 transfer support structure layer tile to transfer medium step
235 transfer part structure layer tile to transfer medium step
240 move transfer medium to tile region of layer transfusion assembly step
245 transfuse part and support structure layer tile to previous layers step
250 transfused part and support layer tile
255 repeat for additional tile regions and layers step
260 3D part and support structure
$L_p$ length in x-direction
$L_t$ length in x-direction
$W_p$ width in y-direction
$W_t$ width in y-direction

The invention claimed is:

1. A method for constructing a three-dimensional part and a support structure with an electrophotography-based additive manufacturing system, the method comprising:
 a) providing a removable support material compositionally including support material particles;
 b) providing a part material compositionally including part material particles;
 c) developing a support layer of the support structure from the support material with a first electrophotography engine;
 d) transferring the developed support layer from the first electrophotography engine to a transfer medium;
 e) developing a part layer of the three-dimensional part from the part material with a second electrophotography engine;
 f) transferring the developed part layer from the second electrophotography engine to the transfer medium, wherein the developed-part and support layers have a maximum printing width in a cross-track direction and a maximum printing length in an in-track direction corresponding to a maximum printable area for the first and second electrophotography engines, respectively;
 g) moving the transfer medium with the transferred part layer and the transferred support layer into alignment with a first tile region of a layer transfusion assembly;
 h) transfusing the transferred part layer and the transferred support layer to previously-printed layers in the first tile region of the layer transfusion assembly;
 i) repeating steps c)-f) to form a second transferred part layer and a second transferred support layer on the transfer medium;
 j) moving the transfer medium with the second transferred part layer and the second transferred support layer into alignment with a second tile region of the layer transfusion assembly, wherein the second tile region is laterally adjacent to the first tile region; and
 k) transfusing the second transferred part layer and the second transferred support layer to previously-printed layers in the second tile region of the layer transfusion assembly; and
 wherein the three-dimensional part is constructed in a three-dimensional part region including the first and second tile regions, the three-dimensional part region being larger than the maximum printable area for the first and second electrophotography engines, a portion of the three-dimensional part being constructed in the first tile region and a portion of the three-dimensional part being constructed in the second tile region such that the three-dimensional part has a footprint that is larger than the maximum printable area for the first and second electrophotography engines.

2. The method of claim 1, wherein step j) includes translating the layer transfusion assembly in the cross-track direction such that the three-dimensional part region has a larger width in the cross-track direction than the maximum printable area for the first and second electrophotography engines.

3. The method of claim 1, wherein step j) includes translating the layer transfusion assembly in the in-track direction such that the three-dimensional part region has a larger length in the in-track direction than the maximum printable area for the first and second electrophotography engines.

4. The method of claim 1, wherein the developed part layer and the developed support layer are transferred to the transfer medium in registration with each other, and wherein the transferred part and support layers are simultaneously transfused onto the previously-printed layers.

5. The method of claim 1, wherein the layer transfusion assembly includes a build platform having a build surface onto which the three-dimensional part and the support structure are constructed, and wherein the build surface is subdivided into a plurality of tile regions, including at least the first and the second tile regions.

6. The method of claim 1, wherein the transfer medium is a transfer belt that travels around a belt path to transport the transferred part and support layers to the layer transfusion assembly.

7. The method of claim 6, wherein the transferred part and support layers are transfused to the previously-printed layers at a nip formed where the transfer belt passes between a nip roller and a build platform onto which the previously-printed layers were constructed.

8. The method of claim 7, wherein the layer transfusion assembly further includes a gantry adapted to move the build platform past the nip roller in synchronization with the motion of the transfer belt such that the build platform moves at a velocity which is substantially the same as a tangential velocity of the transfer belt at the nip.

9. The method of claim 1, wherein the layer transfusion assembly includes one or more heaters to heat the transferred heat and support layers on the transfer medium to a predefined transfusion interface temperature.

10. The method of claim 1, wherein the layer transfusion assembly includes one or more heaters to heat a top surface of the previously-printed layers to a predefined transfusion interface temperature.

11. The method of claim 1, wherein the layer transfusion assembly includes one or more heaters to heat the transfused heat and support layers to a predefined fusion temperature thereby fusing the transfused heat and support layers to the previously-printed layers.

12. The method of claim 1, wherein the part material and the support material have substantially similar thermal properties and melt rheologies.

13. The method of claim 1, further including removing the support structure from the three-dimensional part.

14. The method of claim 13, wherein the support material is soluble in an aqueous-based solution, and wherein the support structure is removed by at least partially dissolving the support material of the support structure in the aqueous-based solution.

* * * * *